United States Patent
Braunheim et al.

(10) Patent No.: US 6,185,072 B1
(45) Date of Patent: Feb. 6, 2001

(54) BASE-PLATE FOR MAGNETIC HEAD SUSPENSION IN HARD DISK DRIVE WITH MATERIAL FOLD-OVER

(75) Inventors: Steve Braunheim; Russell J. Anderson; Kevin Hanrahan; Ryan Schmidt, all of Santa Barbara, CA (US)

(73) Assignee: Intri-Plex Technologies, Inc., Santa Barbara, CA (US)

( * ) Notice: Under 35 U.S.C. 154(b), the term of this patent shall be extended for 0 days.

(21) Appl. No.: 09/444,533

(22) Filed: Nov. 22, 1999

Related U.S. Application Data

(62) Division of application No. 08/943,377, filed on Oct. 3, 1997, now Pat. No. 6,069,772.

(51) Int. Cl.$^7$ ............................................ G11B 5/48
(52) U.S. Cl. ............................................ 360/244.5
(58) Field of Search ................................... 360/104

(56) References Cited

U.S. PATENT DOCUMENTS

| | | | |
|---|---|---|---|
| 5,390,058 | * 2/1995 | Yamaguchi | 360/104 |
| 5,528,092 | * 6/1996 | Ohta | 310/67 R |
| 5,604,649 | * 2/1997 | Hernandez | 360/104 |

* cited by examiner

Primary Examiner—George J. Letscher
(74) Attorney, Agent, or Firm—Owen L. Lamb

(57) ABSTRACT

An arm assembly movable about a pivot includes means for holding a recording head slider on the arm assembly. The arm assembly includes an actuator arm supported at one end at the pivot, and a load beam connected to an end opposite to the one end of the actuator arm and extending to the slider. The load beam includes a load beam boss hole of a given diameter and the actuator arm Includes an actuator arm boss hole. The boss holes are superposed at a connection of the load beam and the actuator arm. The hub includes a fold of material into an outside surface of the hub. The hub extends through the boss holes to maintain the actuator arm and the load beam together. The hub is swaged (expanded) to fix the actuator arm to the load beam such that the fold in the outside surface of the boss grips the actuator arm boss hole. The presence of the fold increases the hub material's ability to achieve a high retention torque in the tension direction by acting as a lever during the swage operation, thrusting the material with greater force into the material of the arm boss hole.

8 Claims, 2 Drawing Sheets

BASE-PLATE FOR MAGNETIC HEAD SUSPENSION IN HARD DISK DRIVE WITH MATERIAL FOLD-OVER

This application is a divisional of Ser. No. 08/943,377, filed Oct. 3, 1997, which is now U.S. Pat. No. 6,069,772 issued on May 30, 2000.

BACKGROUND OF THE INVENTION

1. Field of the Invention

This invention relates to disk head assemblies for supporting read/write heads adjacent rotating disks in disk drives and more particularly, to a base plate for attaching a load beam assembly to a head actuator arm.

2. Description of the Prior Art

Disk drives typically include a stack of spaced apart, concentric magnetic storage disks mounted on a common shaft, and an actuator arm assembly encased within a housing. The actuator arm assembly, also called a head stack assembly (HSA), comprises a plurality of arms extending into spacing between the disks. Mounted on the distal end of each arm is a resilient suspension assembly to which is attached an air bearing slider, the combination of which is referred to as a head gimbal assembly (HGA). Included in the suspension assembly is a load beam, which is mounted at one end to the actuator arm by means of a base plate, and a flexure which is attached to the other end of the load beam and pivotally supports the slider on a gimbal that keeps the slider suspended in a horizontal plane on the disk surface regardless of any motion of the bad beam. The base plate has a flange and a hollow hub. The hub is passed through and extends beyond a hole in the load beam and the flange is welded to the load beam. The hub is then inserted into a boss hole in the actuator arm and the hub is swaged to provide a press fit within the actuator arm boss hole.

The load beam provides the resilient spring action that biases the slider toward the surface of a magnetic recording disk, while the flexure provides flexibility for the slider. A thin film or other magnetic transducer is deposited or otherwise attached at the rearward end of the slider to read or write on the magnetic disk.

A base plate is typically formed by flowing material into the hub region by extrusion from the flange region by a combination of forging and coining. With low hub, thin flange base plates there is often not enough material available in the flange material to flow during extrusion to fill the hub geometry, without decreasing the thickness of the hub.

An object of this invention is to provide a new method of manufacturing a base plate to connect a load beam to an actuator arm in a magnetic head assembly.

SUMMARY OF THE INVENTION

The invention is a base plate that has a flange and a hub that is formed with a fold portion extruded from the flange. In accordance with an aspect of the invention the fold portion may extend beyond an outer diameter of the hub to form a barb.

An advantage of this invention is that it allows the manufacture of base plates with extremely low profile hubs with relatively standard wall thickness by a metal stamping process.

A further advantage of this invention is that the presence of a fold reduces the hard material coupling between the flange and hub portions of the base plate, thereby reducing the gram load change through the swaging process.

A further advantage of this invention is that the presence of the fold increases the hub material's ability to achieve a high retention torque in the tension direction by acting as a lever during the swage operation, thrusting the material with greater force into the arm material, creating a greater press fit.

A further advantage of this invention is that if the fold is such that additional material extends outward to increase the outer diameter of the hub by forming a barb, this allow a press fit, thrusting the barb into the arm material, thereby eliminating the need to swage.

BRIEF DESCRIPTION OF THE DRAWINGS

The invention will be described in greater detail with reference to the drawings in which.

In these figures, similar numerals refer to similar elements in the drawing. It should be understood that the sizes of the different components in the figures may not be to scale, or in exact proportion, and are shown for visual clarity and for the purpose of explanation.

DETAILED DESCRIPTION OF THE INVENTION

Figure 1:
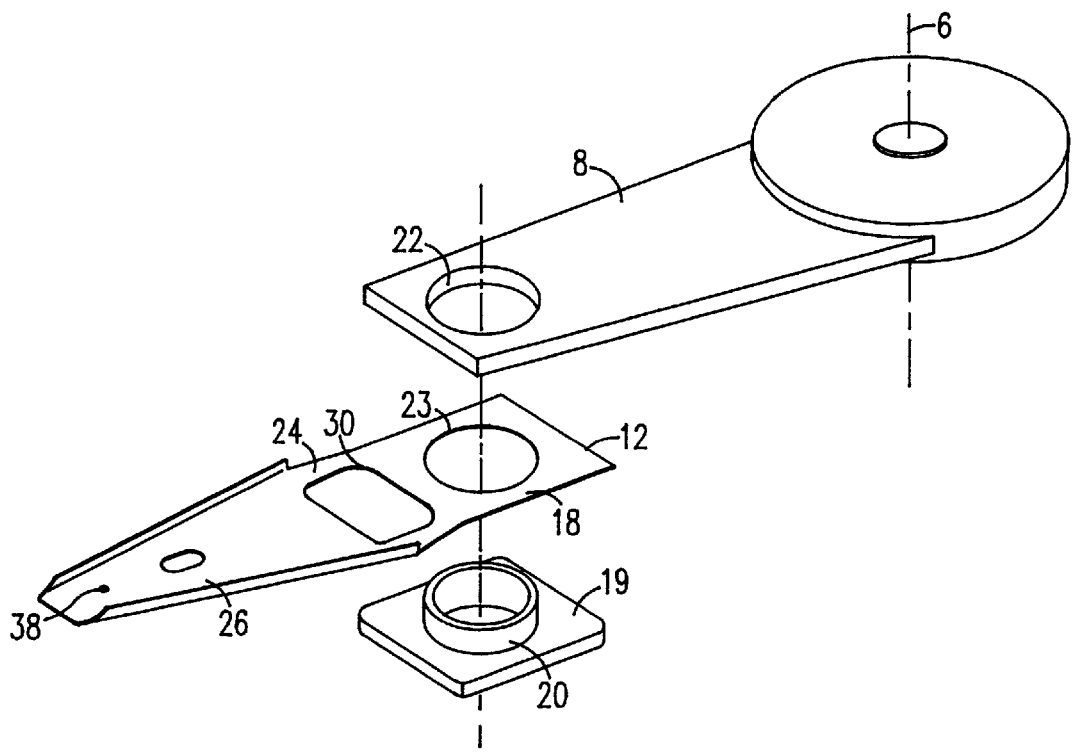
FIG. 1 is an exploded view of a disk drive magnetic head suspension in which the present invention is embodied.

A disk drive has an actuator arm assembly and a stack of spaced apart disks rotatable about a common shaft. The actuator arm assembly is rotatable about an actuator arm axis. The arm assembly includes a plurality of actuator arms which extend into the spaces between the disks. One such actuator arm is shown herein in FIG. 1. Attached to the actuator arm is a magnetic head suspension. The actuator arm 10 when assembled in a stack with a number of identical actuator arms rotates about the actuator arm axis 6.

The magnetic head suspension comprises a resilient load beam 12, a flexure (not shown) and a slider (not shown) on the under side of the load beam 12. The load beam 12 includes a base section 18 having a boss hole 23. The load beam 12 includes a resilient section 24 located between the base section 18 and a protrusion section 26 of the load beam 12. The resilient section 24 is formed to create an angular offset between the base section 18 and protrusion section 26. The degree of bending determines the downward preload force of the slider toward a disk surface. The geometry of the load beam in resilient section 24 and/or the size of an aperture 30 in the resilient section 24 establishes the resilience of the load beam 12. A dimple 38 is formed in the load beam 12, or on the flexure, and is urged against the backside of the slider through a clearance and contributes to a gimbaling action of the slider. A transducer is disposed at the rear edge of the slider.

Figure 2:
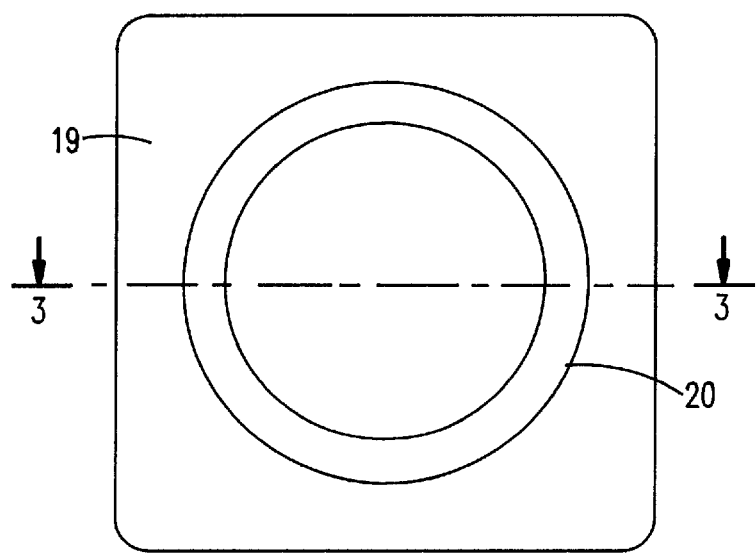
FIG. 2 is a top view of the base plate show in FIG. 1.

The actuator arm and load beam elements of the actuator arm assembly are connected end to end by the base plate which includes a flat flange portion 19 and a cylindrical hub portion or boss 20. A top view of the base plate is shown in FIG. 2. In assembling the actuator arm, the hub 20 is inserted through a load beam boss hole 23 and the flange portion 19 is welded to the load beam 18. The hub 20 is then inserted through an actuator arm boss hole 22. Using a swage machine, a swage ball is driven through the hub 20. The swage ball exerts pressure on the hub 20 which expands (swages) into the boss hole in the actuator arm. The expanded hub rigid connects the hub and attached load beam to the actuator arm boss hole. The expanded hub 20 creates a very tight friction fit against the sides of the boss hole 22. To ensure a tight fit, the length of the hub 20 is such that sufficient contact exists between the outer portion of the hub 20 and the inner portion of the boss hole 22. As the hub plastically deforms, it hardens, which is desirable for maintaining a press fit in the actuator arm boss hole.

Figure 3A:
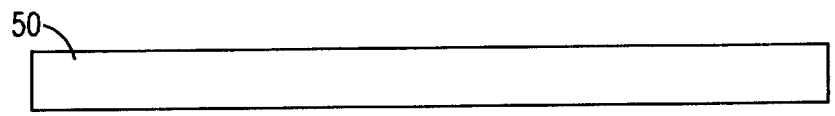
FIGS. 3a through 3d are side views along view line 3—3 of the base plate of FIG. 2 and illustrate the process of making a base plate in accordance with the teachings of the present invention; and, FIG. 4 is a side view of a base plate with a hub having a barb formed thereon.
Figure 3B:
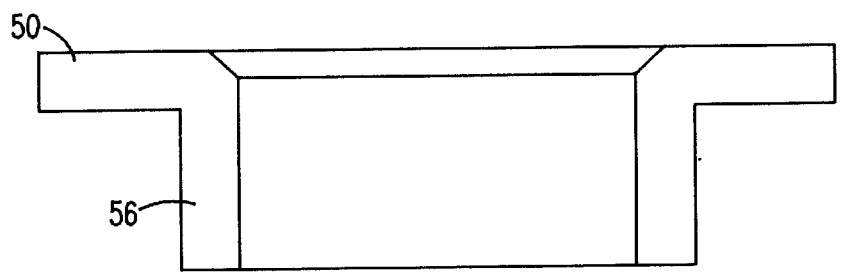
Figure 3C:
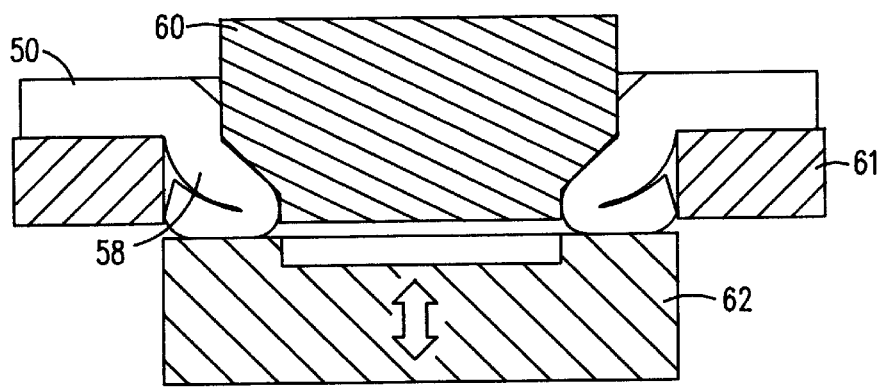
Figure 3D:
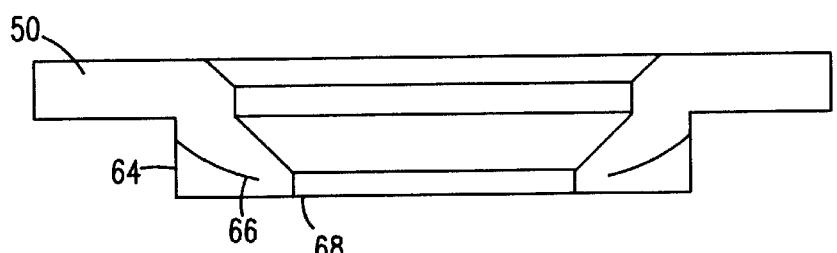

FIGS. 3a through 3d illustrate the steps of manufacturing base plates in accordance with the present invention. In FIG. 3a, a strip 50 of stainless steel is prepared. In FIG. 3b, using known manufacturing techniques, a cylinder 56 is formed. In FIG. 3c, the cylinder 56 is bent back on itself during a first punch/die stamping operation by actuating a suitable punch 62 back and forth into a die 60, 61 as illustrated by the arrow. This operation forms the extruded material into a bent shape 58. In FIG. 3d, the part is stamped in a second punch/die stamping operation to complete formation of the hub 64 with a fold portion 66.

Figure 4:
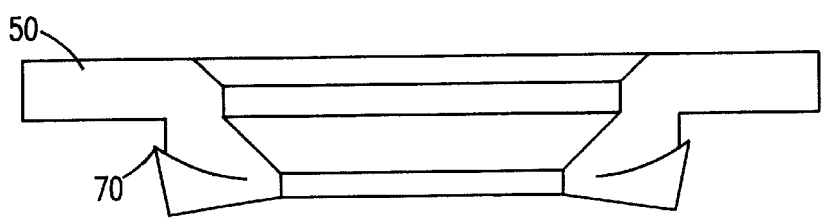

FIG. 4 is a side view of a base plate with a hub having a barb 70 formed thereon. In this case, the fold over portion 66 shown in FIG. 3d is exaggerated during the final stamping operation to cause the material to extend beyond the hub outer diameter indicated by the broken lines to thereby form a barb of a greater hub outer diameter.

It should be understood that the invention is not limited to the specific parameters, materials and embodiments described above. Various modifications and variations may be made within the scope of the present invention.

What is claimed is:

1. For use in a disk head assembly for supporting read/write heads adjacent rotating disks in a disk drive, a one piece, metal base plate for attaching a load beam assembly to a head actuator arm comprising:

a metal flange portion; and, a metal hub portion;

said hub having a fold portion at which said hub is bent back directly on itself, the fold portion being formed in an outer surface of said hub;

an outer diameter of said hub being such that said hub can be inserted into a load beam boss hole in said load beam with said flange portion of said base plate welded to said load beam.

2. The base plate of claim 1 wherein said fold portion extends beyond said outer diameter of said hub to form a barb.

3. The base plate of claim 2 wherein said hub is press fitted into said actuator arm boss hole such that said barb is thrust into and grips said outside surface of said hub to said actuator arm boss hole.

4. The base plate of claim 1 further comprising:

said hub being inserted into said load beam boss hole;

said flange portion of said base plate being welded to said load beam; and, said hub being further inserted into an actuator arm boss hole in said actuator arm such that a swage ball passed through a center of said hub causes pressure to be applied to cause said hub fold portion to expand into said boss hole in said actuator arm, thereby rigidly connecting said hub and attached load beam to said actuator arm boss hole.

5. A device for supporting a transducer in operating position over a recording medium, said device comprising:

an arm assembly movable about a pivot;

said arm assembly comprising an actuator arm supported at one end at said pivot, and a load beam for connection to an end opposite said one end of said actuator arm; and, said load beam including a load beam boss hole;

said actuator arm including an actuator arm boss hole of a given diameter, said load beam boss hole and actuator arm boss hole being superimposed at a connection of said load beam and said actuator arm thereby forming coaxial holes;

a base plate for connecting said actuator arm and said load beam;

said base plate including a flange portion and a hub;

said hub including a fold portion at which said hub is bent back directly on itself, the fold portion being formed in an outside surface of said hub;

said hub extending through said coaxial holes.

6. The device of claim 5 wherein said fold portion extends beyond said outer diameter of said hub to form a barb.

7. The device of claim 6 further comprising:

said hub being press fitted in said actuator arm boss hole such that said barb is thrust into and grips said outside surface of said hub to said actuator arm boss hole.

8. The device of claim 5 further comprising:

said flange portion of said base plate being welded to said load beam; and, said hub being inserted into said actuator arm boss hole in said actuator arm such that a swage ball passed through a center of said hub causes pressure to be applied to cause said hub fold portion to expand into said boss hole in said actuator arm, thereby rigidly connecting said hub and attached load beam to said actuator arm boss hole.

* * * * *